(12) United States Patent
Sundararajan et al.

(10) Patent No.: US 9,009,658 B2
(45) Date of Patent: *Apr. 14, 2015

(54) COMPONENT BASED SOFTWARE SYSTEM

(75) Inventors: Parthasarathy Sundararajan, Chennai (IN); Shyamala Jayaraman, Chennai (IN); Suresh Sathiavageeswaran, Chennai (IN); Madusudanan Rajaraman, Chennai (IN); Srinivasan Ramaswamy, Chennai (IN); Krishnamoorthy Meenakshisundaram, Chennai (IN); Raghuram Devalla, Chennai (IN); Shanmugavel R. Ponnaiah, Chennai (IN); Natarajan Krishnan, Chennai (IN)

(73) Assignee: Ramco Systems Limited, Chennai, Tamil Nadu (IN)

( * ) Notice: Subject to any disclaimer, the term of this patent is extended or adjusted under 35 U.S.C. 154(b) by 911 days.

This patent is subject to a terminal disclaimer.

(21) Appl. No.: 12/822,184

(22) Filed: Jun. 24, 2010

(65) Prior Publication Data

US 2010/0325606 A1 Dec. 23, 2010

Related U.S. Application Data

(63) Continuation-in-part of application No. 11/029,989, filed on Jan. 5, 2005, now abandoned.

(60) Provisional application No. 60/553,247, filed on Mar. 15, 2004, provisional application No. 60/553,162, filed on Mar. 15, 2004, provisional application No. 60/553,248, filed on Mar. 15, 2004, provisional application No. 60/553,246, filed on Mar. 15, 2004, provisional application No. 60/553,467, filed on Mar. 16, 2004.

(51) Int. Cl.
*G06F 9/44* (2006.01)

(52) U.S. Cl.
CPC .................................... *G06F 8/10* (2013.01)

(58) Field of Classification Search
None
See application file for complete search history.

(56) References Cited

U.S. PATENT DOCUMENTS

| | | | |
|---|---|---|---|
| 6,243,858 B1* | 6/2001 | Mizoguchi et al. | 717/107 |
| 6,505,342 B1* | 1/2003 | Hartmann et al. | 717/104 |
| 2002/0100014 A1* | 7/2002 | Iborra et al. | 717/104 |
| 2003/0028579 A1* | 2/2003 | Kulkarni et al. | 709/100 |
| 2004/0044985 A1* | 3/2004 | Kompalli et al. | 717/100 |
| 2005/0096937 A1* | 5/2005 | Subash et al. | 705/1 |

(Continued)

*Primary Examiner* — Jue Louie
(74) *Attorney, Agent, or Firm* — Prakash Nama; Global IP Services, PLLC

(57) ABSTRACT

A computer implemented model-driven method to generate platform specific code for a user interface is disclosed. In one embodiment, the method includes, capturing customer requirements of the software component in a schema, modeling business-software architecture of the software component in a first level of the schema, modeling technical architecture of the software system from the modeled business-software architecture in a second level of the schema, defining events in the schema that connect the first level and the second level of the schema, defining links in the schema that represent interactions between the user interfaces, defining integration services in the schema for each of the events, mapping each element in the first level to a corresponding one of the elements in the second level using the events, links, and integration services in the schema, loading the schema of the software component into a code generation repository.

11 Claims, 8 Drawing Sheets

(56) References Cited

U.S. PATENT DOCUMENTS

| | | | |
|---|---|---|---|
| 2005/0203913 A1* | 9/2005 | Sundararajan et al. | 707/10 |
| 2006/0144010 A1* | 7/2006 | Wolf | 52/750 |
| 2006/0242195 A1* | 10/2006 | Bove et al. | 707/103 R |
| 2007/0038977 A1* | 2/2007 | Savage | 717/106 |
| 2010/0058287 A1* | 3/2010 | Sundararajan et al. | 717/104 |

* cited by examiner

COMPONENT BASED SOFTWARE SYSTEM

RELATED APPLICATIONS

Benefit is claimed under 35 U.S.C. 120 to U.S. Non Provisional application Ser. No. 11/029,989, entitled "COMPONENT BASED SOFTWARE SYSTEM" by inventor Sundararajan Parthasarathy et al., filed Jan. 5, 2005, which is herein incorporated in its entirety by reference for all purposes.

FIELD OF THE INVENTION

The present invention relates to component based software systems, and in particular, the development, testing, and deployment of such systems.

BACKGROUND OF THE INVENTION

Component-based software development is the current trend in software technologies. A software component may be thought of as a self-contained unit that encapsulates and implements the behavior of a single function.

A complex software system for an organization that spans multiple business functions is normally made up of multiple components. And since the various functions in a business interact with each other, components also need to interact with each other. Development of such multi-component software systems comprising multiple interacting components usually involves multiple development teams with each team responsible for a distinct set of components. The development and roll out may be done in phases with interacting components developed and delivered at different times. For successful development and deployment of such a software system, it is important to be able to develop and test a component in a truly standalone, independent manner, separately test its integration with other components, and subsequently assemble and connect the interacting components together at the deployment stage. The inability to achieve successful development and deployment in software technologies is a problem in the struggle towards creating practical software components. This is compounded by the fact that on a micro-level, the functionality inside the component is not expressible in a standard way for users to understand before they assemble an application using components.

The choice of technologies used to create software further complicates system development because of the lack of standard architectural or structural elements in describing software. Moreover, the functionality provided by software components cannot be abstracted to a reasonably finite set at any point in time. This is in contrast to standard electronic components that pack huge amounts of functionality and behavior into data sheets that describe the various interfaces (pins), properties of information transfer through these interfaces (voltage, signal frequency, etc.), and the expected behavior in terms of the effects on the output interfaces (pins). However, such data sheet based specifications are not available for software components. Rather, software components need fabrication and a certain amount of engineering every time a new application is created. Ironically, even though software is supposedly more malleable, it is electronic components that do not need any engineering to adopt them into an overall functionality. Consequently, problems faced by the industry in making software components include a lack of a standard definition, a lack of an independent production approach, a lack of transparency in functionality and interface properties, and a lack of support needed for making available respective data sheets, assembly instructions, and engineering instructions.

To address some of these problems, generating code out of specifications has been attempted over the past couple of decades. Early approaches involved logic modeling, and later efforts used specifications applied to various sets of diagrammatic conventions to generate code onto target technologies. However, none of the prior attempts were very successful, as they got caught up in the modeled logic, the programming language, or the tediousness of the approach. As a result, the development community reverted back to coding in the conventional way. Consequently, generating code out of specification has up to this point suffered from at least the following drawbacks. First, attempts to generate code for a logic model required extensive detail work at the specification level. This basically transferred the error prone details of development from the details of coding to the details of specification design. Second, even when specifications were used, there has been no standardization of the specification and/or the formal data structures that store and retrieve information. Third, a much needed Change Management process has not been thought out and implemented, causing specifications and models to be out of sync and rendering forward engineering ineffective. Therefore, an issue is the lack of understanding of how to go about creating and managing specifications for software components in such a way that Code generation is possible.

A closely related issue to code generation is the packaging of the generated artifacts (i.e. executable code) for deployment. Currently, deployment packaging varies to a great extent depending on support technologies and the operating system, and packaging the artifacts out of the code generator is a major task in deploying the generated application. Presently, tools in the market are aligned to single support technology and do not cater to multiple support technologies.

Component based software systems have user interfaces that link a user and the system. User interfaces may be a critical part of any software solution since the end user experiences the solution through the user interfaces. User interfaces are many times created by developers who specialize in aesthetics and feel of interfaces. While this makes the interface more creative, it also at times makes it non-standardized. End users do not usually feel comfortable with solutions that require them to operate various user interfaces in many different ways. So in this era of software component assembly, if the user interfaces are not standardized and similar, the resultant assembly will not have consistent usability in user interfaces. Moreover, if there is no standardization, maintenance of the user interfaces becomes more difficult, especially if the interface creator is no longer available.

On the technical level, user interface requirements for some applications can be very demanding. For example, it may be required to capture multiple line items for a document based interface. This is achieved by using a grid control in the user interface. This is even more difficult when the application is Web based. Moreover, it may be required that the application be available on multiple platforms like Windows, UNIX, OS/400, etc., and that it also be available on a wide range of browsers and devices.

One problem with current grid control solutions however is that they are tied to either a particular platform or technology. And a problem with Web based grid controls is that users are very much accustomed to friendly desktop based applications with rich user interfaces. Any Web based control should therefore provide the same rich user interface and ease of use. On the performance side, Web based applications should send as little data as possible over the Web. Because the grid control can hold hundreds of thousands of rows of data, sending all of them over the Web from the client browser to the Web server takes a great deal of time. Since the users are very much used to the fast desktop-based applications, slow Web based applications are not always acceptable.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A method and system for component based software system to generate platform specific code for a user interface in a software system is disclosed. In the following description, for purposes of explanation, numerous specific details are set forth in order to provide a thorough understanding of the present invention. It will be evident, however, to one skilled in the art that the present invention may be practiced without these specific details.

In one embodiment of the invention, a component is defined as a self-contained software application that encapsulates and implements a single function. The terms 'task', 'business task' and 'action' are used interchangeably throughout the document.

Figure 1A:
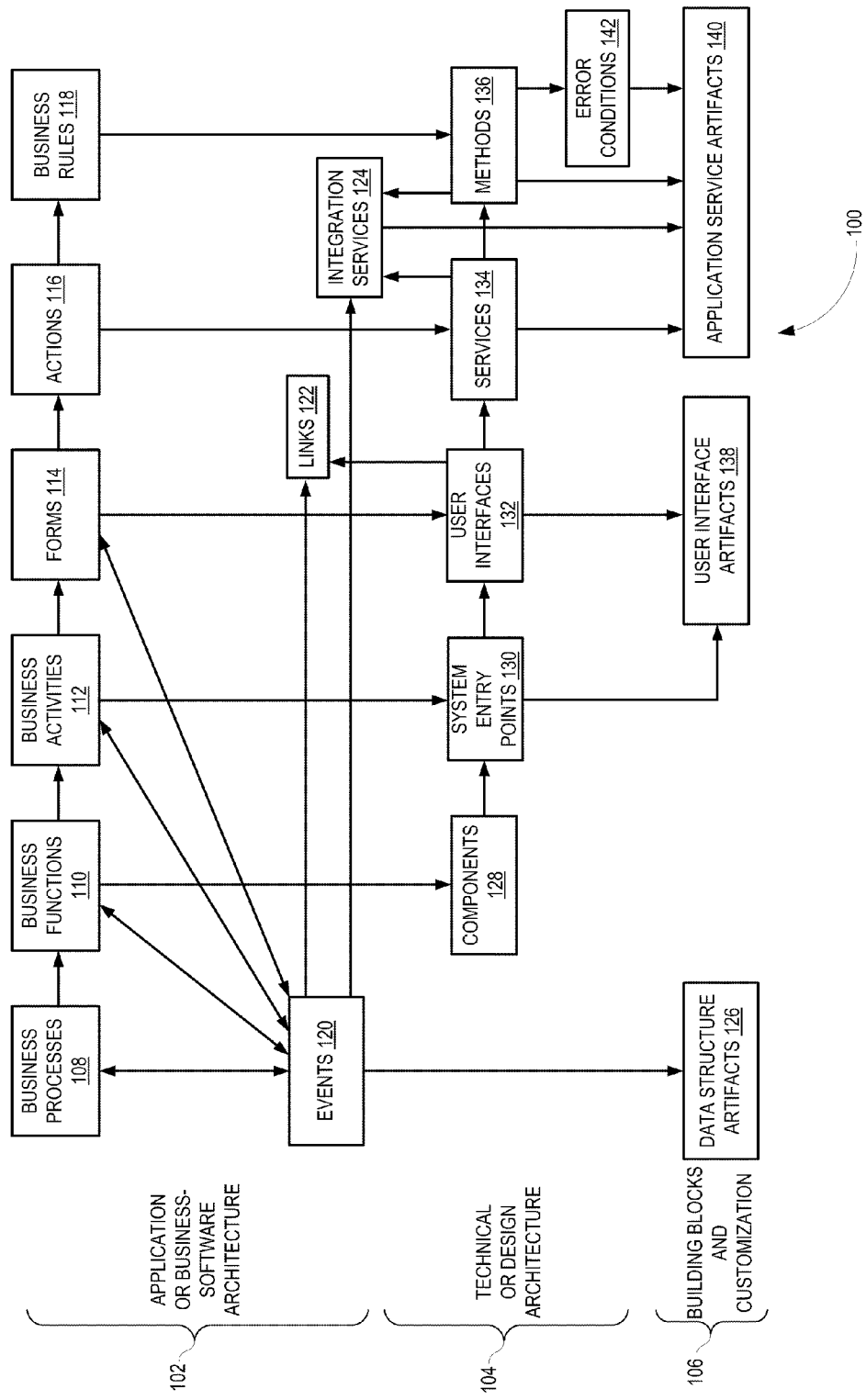
FIG. 1A is a schema for gathering requirements and for creating and managing enterprise software from the gathered requirements, in accordance with one example embodiment of the present invention.

FIG. 1A is a schema 100 for gathering requirements and creating and managing enterprise software from the gathered requirements in accordance with one example embodiment of the present invention. The schema or software structure specification 100 includes multiple levels of abstraction of requirements. The first level 102 is an application or business-software architecture level. The first level 102 is used to define the high level requirements in context relevant syntax. The multiple levels of abstraction of requirements are stored in a database schema/software structure schema (e.g., the software structure schema 212 of FIG. 2) form in one embodiment, such that lower levels, progressing toward actual coding are linked to higher levels. A second level 104 is used to represent a technical or design architecture of the first level 102. The second level 104 serves as an intermediate link between the first level 102 and a third level 106 that represent actual building blocks and technology specific customization.

The first level 102 is a process expression level. The first level 102 includes a plurality of elements or units, each of which stores various aspects of specifications derived from the requirements and software built to those specifications. In some embodiments, the first level 102 includes business processes 108 that define requirements at a level compatible with thinking processes of business-requirements experts. In some embodiments, the business processes 108 are divided into a first five units including business functions 110, business activities 112, forms 114, actions 116, and business rules 118.

An example of a business process might be sales order processing for a business. The business functions 110 may include purchase requisitioning, approval and purchase order dispatch. The business activities 112 may include an acknowledgement, get best quote, release purchase order. The forms 114 may be defined in terms of show all pending purchase orders for approval, an approval screen, and others. The actions 116 may include things like fetch next purchase order for approval, link to next page, send acknowledgement, or send rejection.

The business rules 118 may include things like "if no request, tell user x". As illustrated, the first level 102 contains a textual description of the business or other process to be implemented by a computer system or otherwise electronically. The descriptions take the form of text that is very relevant to one who is designing the business process 108. In one sense, it is an abstract representation of the actual code that will be written, but in another sense, it separates the structure of the implementation from the expression of the process.

The second five units represent the design architecture 104, and include, in some embodiments, components 128 that represent the basic software units of this approach, system entry points 130, user interfaces, 132, services 134, and methods 136.

In some embodiments, each of the first five units is mapped to a corresponding one of the second five units, e.g., business functions 110 are mapped to components 128, business activities 112 are mapped to system entry points 130, forms 114 are mapped to user interfaces 132, actions 116 are mapped to services 134, and business rules 118 are mapped to methods 136. In some embodiments, error conditions 142 are provided for methods 136.

Further, the business processes 108 and associated events 120 represent operational flow across the organization for which the software is being developed. The events 120 include entry and exit events to the constituent functions 110, activities 112, and forms 114, and are connectors that define flow of control or interfaces between other units. The business activities 112 and their associated events 120 represent the operational flow across a unit within the organization. The forms 114 and their associated events 120 represent specified interface map for the systems and software being developed.

Links 122 are formed from mapping of the events 120 that represent interconnections, or from the user interfaces 132. Integration services 124 are formed from mapping of the events 120, services 134, and/or methods 136.

Furthermore, the third level 106 includes building blocks and customization. Data structure artifacts 126 are generated from the events 120 and the components 128, user-interface artifacts 138 are generated from the system entry points 130 and the user interfaces 132 of the second five units, and application service artifacts 140 are generated from the services 134 and the methods 136. In some embodiments, application service artifacts 140 are also generated from the integrations services 124 and the error conditions 142.

In accordance with the above described embodiments with respect to FIG. 1A, model based software solutions involve approaches and implementations in which every significant part of software development lifecycles can be modeled as data and persisted throughout a system. In one embodiment of the invention, model based software solutions provide capabilities that enable users to perform various steps in the software development lifecycle. Specifically, persisted data are passed from upstream processes to downstream processes in the operation and maintenance of the software system.

Consequently, an embodiment of the invention uses model strategy for both storage and deployment functions. It demarcates the layers of storage into the business-software architecture nodes/artifacts 102, technical nodes/artifacts 104, and building blocks and customization nodes/artifacts 106. This allows for defining each of these layers as master data information in artifact packaging.

The model hierarchy at a requirements management stage has information on the business processes 108, business functions 110, components 128, business activities 112, forms 114, tasks/actions 116 and business rules 118. System attributes that need to be available are captured and stored in the model. A traversable user interface prototype, use case report and flash based review form the deliverable at this stage. The next stage of engineering deals with the business functions 110 and the components 128 as its initial basis for work. That stage has information on the detailing of the business flow rules 118, messages that become errors or information signs, tasks/actions 116 detailed as the services 134, cross component interactions for data updates through the integration services 124, and the methods 136 that solve the data flow implemented mostly as stored procedures. An advantage this model has is that the business object or the integrated business object enables ease of unit testing by creation of a software structure schema (e.g., the software structure schema 212 of FIG. 2) using the model information of the service/method structures and applying the minor changes to fit the needs.

The third level 106 (e.g., the technology layer or the building blocks and customization) of the model contains details pertaining to Web, application, and resource management artifacts, with the deliverables listed and stored in the database for packaging and installation. Web layer artifacts may be HTML and JavaScript (JS) files. An embodiment that is a Microsoft version could have Dynamically Linked Libraries (DLL's) and Java versions of the deliverable (with additional class files). In addition to the deliverables, i.e. the executable code, generated source code is stored as binary large objects (BLOBs) in the resource management area of the model. This is possible owing to a clear distinction between the customer and the project worked upon, with supporting evidence of the version and "Requirements Change Notice (RCN)" as supporting attributes to store and retrieve the data for use at any point in time. Facilities for minor changes can be recorded for individual artifacts through proper routes. A release manager controls the list of artifacts that can be allocated to work on, thereby easing the confusion that may otherwise arise out of simultaneously working on the same artifact in response to more than one change notice. With reviews and checkpoints in place for each artifact in each of the model based processes, maintenance and support become easier. A question as to what is not there in the model will highlight the information set that this artifact packaging will hold before it is rolled out to any client site.

Releases of software, and in particular maintenance releases, using this model are much easier to implement. One reason for this is that the generated code is syntactically precise. An impact analysis is performed for the artifacts of the model at the different layers, and estimates of these analyses are collected. Then, the releases are scheduled without much effort because most of the engineering changes are template based, and final code generation of the affected areas are based only on the finalized list of impacted artifacts. Test cases are also generated based on the model information with provisions for test data for validation to ensure that a robust and a scalable application is delivered.

A model based infrastructure enables a history of information to be available through proper configuration management. The advantages of model driven releases and implementations are that they have sets of these data as "versions" of information with proper documentation for each set. Security is enforced at each of the artifacts, based on "ownership" and ability for supervisory roles to overrule the same as checkpoints for ease of use in release and delivery. The model driven releases also provide re-usability of existing software artifacts and in turn make the enhancements on already delivered software artifacts easier.

The management of software and/or system changes brought about by maintenance or other reasons is aided by several features of one or more embodiments of the invention. First, the formal representation of the associated software structure specification serves as a structured knowledge base representation scheme. Second, the system in this embodiment has technology independent architectural elements that guide the software specifications. Third, this embodiment has standard processes to operate the software development lifecycle.

Figure 2:
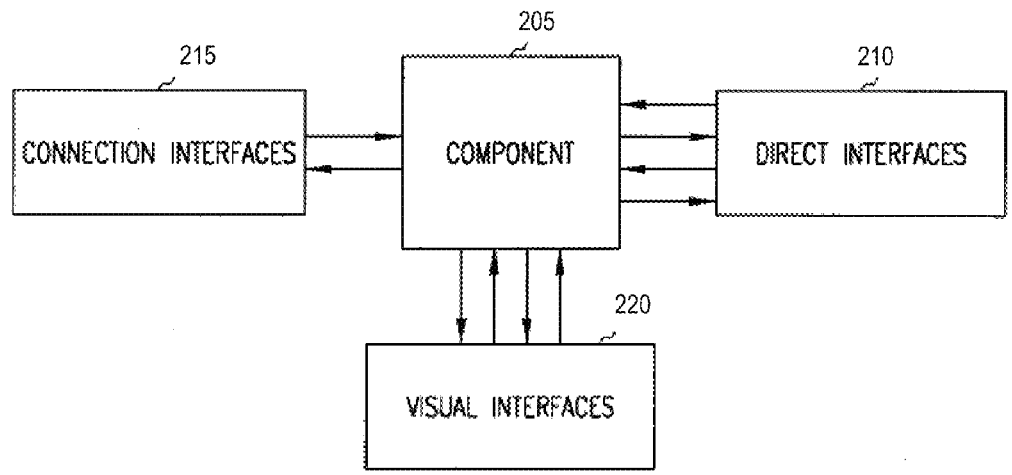
FIG. 2 illustrates an example of a typical software component and its interfaces to other system entities, according to one embodiment.

In one example embodiment, when a business requirement changes (e.g., the addition of a new report or the change of an existing report), an embodiment of the invention analyzes the impact of a proposed software/system solution to the business change using a knowledge repository (e.g., the knowledge repository 214 of FIG. 2). First, this embodiment identifies the impacted items (i.e. artifacts) through the connections persisted in the knowledge repository. This analysis is conducted until no new additions appear on the list of additional items to change. The list is then subjected to an estimation of the effort required to implement the changes. If the impact is estimated to be too great, a decision may be made to attempt a different alternative. This impact analysis approach provides for a "what if" analysis before committing to a decision.

In cases where the underlying technology or platform changes, rather than the software, the knowledge repository created in terms of fundamental architecture elements lends itself to looking at a proper technology mapping without having to recreate the knowledge base again.

The built in lifecycle processes enable smooth handover between the functions belonging to various phases and ensures that the listed items are the ones that are changed. Eventually, the artifacts delivered as part of the change are correctly associated with repository elements aiding in sophisticated maintenance management.

In one embodiment, engineering entities function together to invoke database stored procedures that are associated with design methods. Each such stored procedure in turn invokes different stored procedures. Each such stored procedure accesses data through interface views provided by other components or from their own data store. The main power of a model based development environment then is to have a clear traceability of system development and design from the inception of the problem solving phase to the end of the engineering phase where the code gets delivered to the end user. These processes are tightly integrated with the planning and rollout processes.

Given these requirements for implementation with Microsoft technology platform, the mapping between the first, second and third level is given in the following Table 1.

TABLE 1

| Requirements specification Business architecture elements | Mapped Design-specification provides corresponding Technical architecture elements | Implementation in the sample technology architecture (for example, Microsoft-based technology) |
|---|---|---|
| Business functions | Components, Business Objects | Tables in a RDBMS-like MS SQL server |
| Business activities | System entry points | Menu items implemented using ASP, HTM |
| User interfaces or forms | Screens | HTML pages, Active server pages |
| Tasks or actions performed on the user interface | Services | COM + DLLs implementing the service behavior using Visual basic |
| Business rules | Process sections, Methods | Stored procedure for business logic, VB code for business logic |
| Events | Links, Integration services, Interface business objects | Links are implemented as Hyperlinks in HTM for UI lookup. Interface business objects are implemented as stored procedures, views, for data lookup, Integration services are implemented as COM + DLLs for integration with external systems. |

For different technology platforms and recommendations, the mapping can be suitably specified to ensure implementation does not violate the architecture guidelines.

This provides the following advantages: a clear technology-implementation mapping that preserves adherence to architecture guidelines. Future re-implementation in other technology platforms can be driven from the same set of specifications and specific mapping. The clear separation of concern between the architect, engineer and implementer leads to better productivity and discipline. The architect's concerns now focus on business needs without being constrained by the implementation methodology or technology. The engineer's concerns are now to design the system to address the business needs without being constrained by technology. The implementer's concerns are now for developing the system using a particular technology to address the business needs based on the design.

Figure 1B:
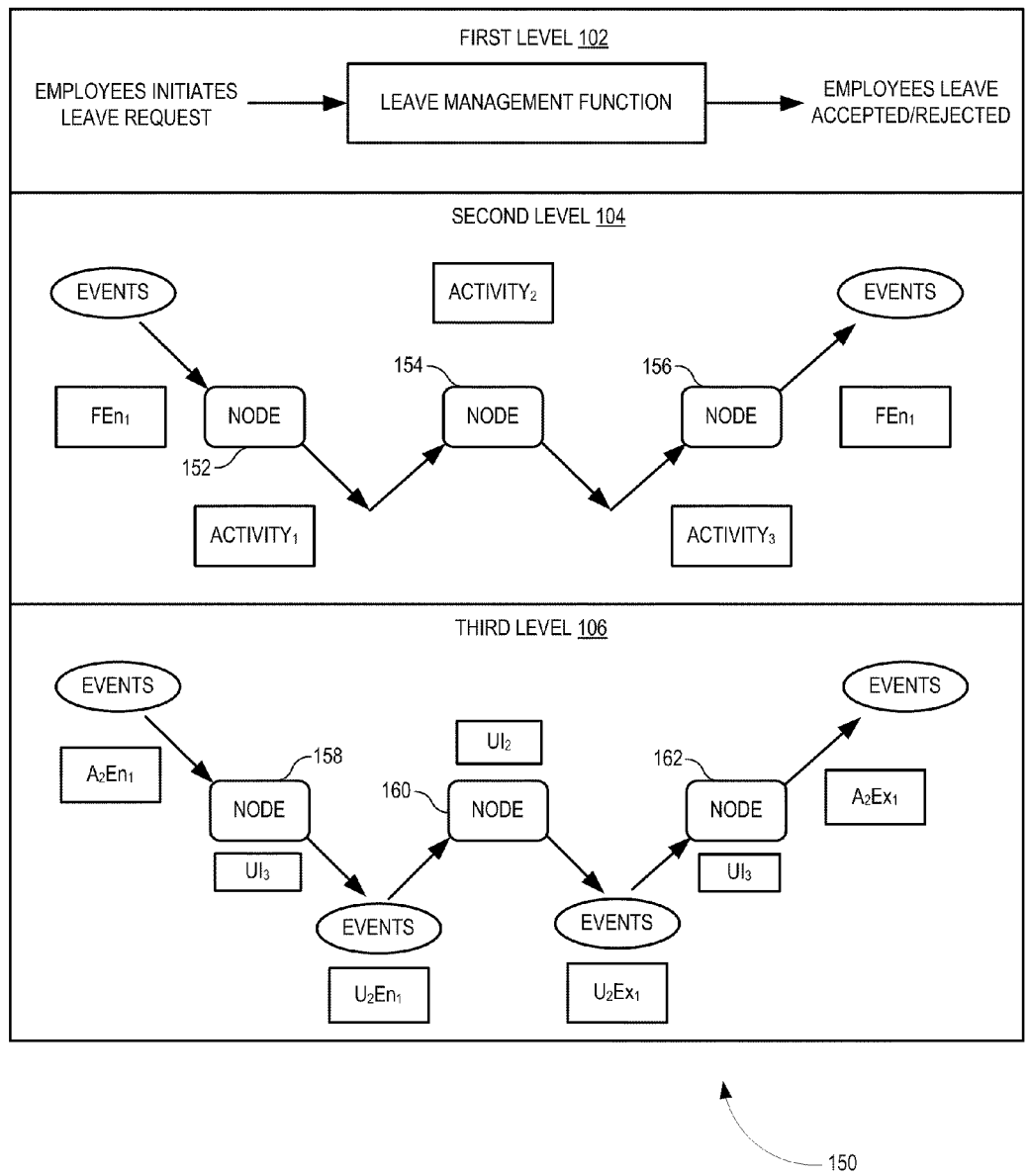
FIG. 1B represents exemplary connections within and across levels, which are used as the software is being developed, engineered and tested, in accordance with one example embodiment of the present invention.

FIG. 1B represents exemplary connections 150 within and across levels, which are used as the software being developed, engineered and analyzed in accordance with one example embodiment of the present invention. A first level corresponding to the first level 102 in FIG. 1A in the diagram creates a process flow by depicting entry events and exit events to the constituent functions from/to other functions in the same process or across processes. The standard connective elements (which connect the standard architectural elements) are events that are triggered by and/or handled by the various architectural elements (FEn1, FEx1, AEn1, AEx1, UEn1, UEx1). FEn1 represents an entry event handled by function 1. FEx1 is an exit event generated by function 1. AEn1 is an entry event handled by activity 1. Events are represented by ovals in FIG. 1B. AEx1 is an exit event generated by activity 1. UEn1 is an entry event handled by User Interface 1. UEx1 is an exit event generated by user interface 1.

The second level 104 for activity flow uses the entry event for the corresponding functions as the start event to create the set of activities and interactions through events to reach the end events for the function. Each activity node 152, 154 and 156 is expanded along the same principles to depict the user interface (UI) flow (e.g., forms) needed to complete the activity. The next level 106 represents tasks at task nodes 158, 160 and 162 on the UI and subsequently the business rules to be implemented for the tasks expanded. Events are again represented by ovals.

This approach creates a complete map of the system behavior up to the business rules/policies level and will be the driver for engaging with customers for whom the code is being written. The nodes translate to relevant nodes in engineering. The events that connect them are classified and translated to information-exchange events (these are implemented as UI look ups, and data look ups at the SP level for performing the validations), and transfer-of-control events (these are implemented as integration services across component boundaries and data updates across boundaries for local storage inside the component boundary).

Events are now described with respect to an example business process in FIG. 1B. An event is a stimulus that triggers a function/activity/form. The function/activity/form responds to the stimulus and results in an response. The stimulus is referred to as an entry event and the response as an exit event. An example of an entry event at the function level is "Employee initiates leave request." The function that responds to this stimulus is a leave-management business function.

An example of an exit event is "Employee leave request approved/rejected." UI lookups are user interfaces provided to look up certain reference information in the course of completing a transaction. For example, during the processing of a leave authorization, the supervisor could look up the leave balance of the employee. Data lookup is the reference information used to validate data in the database. An example of such lookup is the validation of employee eligibility for the type of leave applied for. Stored-procedure-level look up is used where multiple business rules need to be implemented in a common environment.

An event within the system querying for information is an information-exchange event, e.g., checking an available-to-promise date from a production schedule, or checking on vendor rating for a purchase order creation. A transfer-of-control event is an event within the system that transfers information and control to the next function in a business process, e.g., items ready for packing to be handled by the packing function, or invoice to be raised for item purchased to be handled by accounts payable.

The mapping of the nodes and events to the underlying engineering models complete the packaging and prepares for implementation. For new solutions, mapping is the analysis effort of deciding on the implementation mode for the events with the nodes already defined. Impact analyses or changes are recorded as a set of events that needs to be added or deleted or enhanced in terms of the information content. The mapping information is used to create the traced impact on the engineering model elements affected and forms the basis for the changes to be engineered into an existing solution. This component initiates the changes at the process-function level and can go in-depth until the business rules are implemented inside the software.

For a typical application, changes that can impact events at the process and/or activity level provide information for probing impact at the levels below. There can be changes which attribute to the flow and the node in specific. The specification of this attribute provides the connectors to be involved at both ends in an event-managed impact analysis. Subscription and publishing of the information is affected in this impact.

The user has the option of taking up the impacted change provided as side impact or ignoring the suggested changes, based on his ability to assess the impact. An example of impact at the activity level would be flow change. This change flow will may result in user interface(s) that may have addition or deletion of controls/elements in the presentation and subsequent use of the data from these controls/elements in the processing area. So if it impacts the processing further down, the impact is identified by its engineering nodes that need modification. Implementation using business logic may change to accommodate this accepted/suggested modification.

In a case where the leave-management function interacts with the employee-handling function, there could be a change envisaged that the employee eligibility for different leaves is based on an employee type. This may leads to a change in the signature of the IE event connecting leave management and employee handling. This change in the event at the function interaction level is used to find the possible impact at other levels based on the mapping of this information exchange event at a function level to its implementation details and also to the events at activity, user-interface levels. This may lead to a change in the data exchange between the two user interfaces and also change in the service signature of the leave eligibility service.

The following advantages may result: a single context relevant diagram/syntax may be used for representing business architecture. Its formal structure provides for persisting the business-architecture specification. Persistence is the storing of the specifications in a data base system so that it may be used by others at any other point in time. This results in a persistent blueprint for driving software engineering and the roll out of the finished information systems. It also allows business-impact analysis and implementation independence.

As illustrated in FIG. 2, there are then several facets to a component. A component 205 has direct interfaces 210 that are invoked from external agents (inter-system). The component 205 also has connector interfaces 215 that are invoked by, or on behalf of, other components within this system (intra-system). Components also have visual interfaces 220 that are invoked from the standard interface devices such as clients and browsers. Within a component itself, there are interface specification lists that define the structure of information supplied to and received by the component, internal data structures that are the schema for data persistence inside the component, interface behavior specifications that list the logic flow inside the component when an interface is invoked, and facilities to generate the resultant output on the related interfaces.

Such a component based system provides several advantages. It provides traceability of business processes in software implementations. Since the software component definition is well defined, reusability of code is possible. Additionally, because behavior transparency is present in component based systems, identifying the engineering needs is somewhat easier. Moreover, direct interfaces implemented in suitable technology provide for inter-operability with systems, even those systems developed and deployed with conventional approaches. Similarly, the connector interfaces and specifications help in an independent production approach providing stub specifications for testability as an autonomous component. As a result of the preceding, categories of visual interfaces can be implemented in multiple technologies. This all provides for a clear understanding of components, functionalities, and dependencies vis-vis information requirements.

Another embodiment addresses the realm of multi-layered/multi-component Web based software systems, and provides an approach for independently developing and unit testing a component of an integrated business system without having the source and executable codes corresponding to the various other components with which this component interacts. This component can then be separately tested for integration requirements when the connector components themselves are available. In another embodiment, components are independently rolled out and then connected with their interacting components when they become available.

This particular embodiment accomplishes this by adopting a model-driven approach to component development, i.e. the software specifications are captured in a model, and the model is then used to generate the code. The modeling elements for capturing the specifications include connector interfaces, interface specifications, and interface behavior specifications. Connector interfaces are the interfaces of the component through which it interacts with other components of the system. These interfaces can be between the user interfaces of the components (Web layer), the services of the components (Application layer), or the data structures of the components (Data layer). Interface specifications describe the structure of the information exchanged with the interacting components. Interface behavior specifications are the logic flow within the component when an interface is invoked and the resultant output to the related interfaces. Put together, these modeling elements describe the interactions of a component with other components of the system.

Once the specifications of a component are captured in the model, the construction phase is initiated. In this phase, a single component's technical specification is downloaded into a code generation repository. From this repository the technology platform-specific code for the component is generated. Two versions of the component's code are generated—standalone and integrated. In the standalone version, all the connector interfaces are implemented through stubs. Standard stubs are implemented for each type of connection, and these stubs implement standard behavior. The integration version of the component code provides the actual implementation of the connector interfaces of the component. This version of the code can be generated when the technical specifications of the integrating components are completed.

Figure 3:
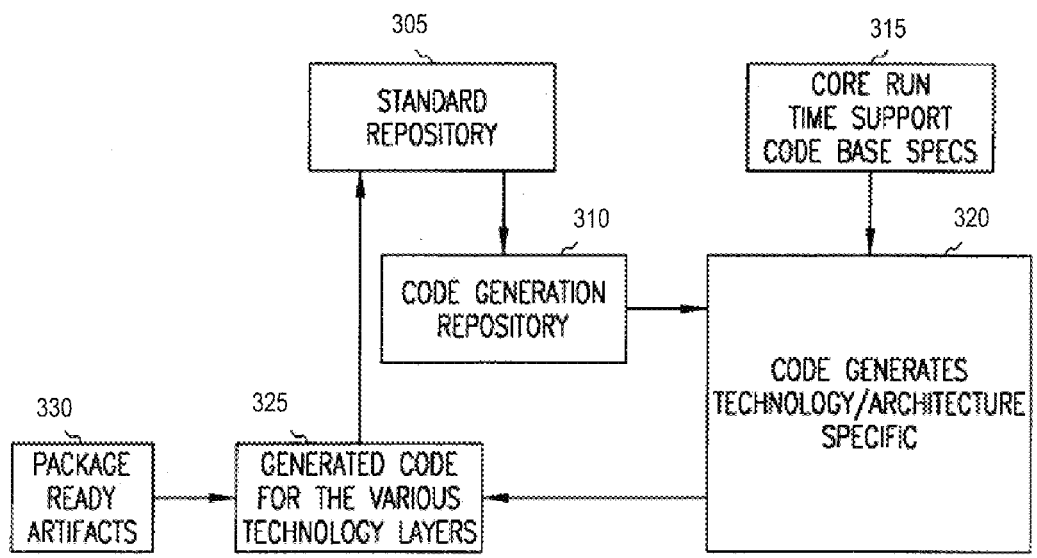
FIG. 3 illustrates in diagrammatic form a code generation process, according to one embodiment.

FIG. 3 illustrates the code generation process. Specifically, one or more embodiments of the invention insure that standard representations of software specifications are available in Block 305. This helps in developing code generators in Block 310 with standard semantics for multiple technologies and technology usage selection options. In some embodiments of the invention however, code generation covers only the flow aspects of the processing, and leaves the logic pieces to be manually coded. After code generation, core runtime support is available in Block 315 that is specific to underlying technologies in Block 320, and the generated code is implemented over the various system technology layers in Block 325. And when there is an improvement or advance in underlying support technologies, the component based design permits the changes that are needed to adopt to these improvements to be localized, leading to faster adoption without entire regeneration. Support is also available for integrated packaging leading to easier deployment of the generated artifacts. Lastly, an integrated change management process identifies the changed artifacts to be generated and deployed.

Information stored in the standard repository supplies naming conventions and code generation related specification attributes. This is moved from the standard repository 305 to a specific code generation repository at 310. Code generators use the interfaces offered by standard runtime artifacts 330 for specific technologies and generate the artifacts into the different technology layers. The artifacts and the packaging scheme are technology dependent and are available in the specific code generation repository. A change management process specifies the list for code generation and the generation cycle is used to generate the specific artifacts. The unit of work at the code generation level is a component, and subsequent changes are at a lower granular level to avoid disruption of deployed artifacts.

In one embodiment, to actually deploy the invention, the following steps are taken. First, the software specifications of components are captured in a software model. The three main parts of a component that are captured are the connector interfaces, the interface specifications, and the interface behavior specification. Second, the specification of a component is downloaded into a code generation repository. Third, the standalone version of the platform specific code for the component is generated from the code generation repository. Fourth, unit testing of the component is performed. Fifth, the component is independently rolled-out. Sixth, integrated specifications for this component are downloaded into the code generation repository. Seventh, integration testing of component interfaces is performed. Finally, integrating components are rolled out and connected with the component.

One advantage of this embodiment includes the ability to independently fabricate and test each component. Also, true unit testing can be practiced where the standalone version of the component is tested for internal behavior. The connector stubs ensure that the component does not break down because of the absence of the actual connecting code. That is, there is an independent deployment of components with stub implementation of interfaces. Thereafter, a separate integration testing phase is implemented where the integration version of a component is test deployed along with its connecting components and the connection interfaces. Then at deployment time, integrating components can be assembled and connected where the stub connectors of a component are transparently replaced with actual implementations.

The foregoing disclosure of software specifications, modeling, and code generation can be used in connection with user interface modeling to solve the problem of lack of standardization of user interfaces and to ensure consistency of user interfaces across a software system. Consequently, to ensure standardization and consistency, the user interface structure should be modeled and the user interface itself should be generated. Then the requirement of repeatability and consistency for user interface generation will be met.

To understand this embodiment of the invention, it is helpful to understand exactly what a user interface is. First, a user interface is a collection of data items that are laid out in a structured fashion. It can have a tabbed look and feel, which enables the-user to group various sections of a document as tabs and enables the user to work on one section at a time. This ensures that the user views only those data that are relevant for the current operation and all the other related data are available at the click of a button. Each page (or screen) of a document is a collection of sections, and the positions of these sections are captured as logical coordinates within the page (screen). These positions do not normally correspond to the exact X/Y coordinates on the screen, as these will be arrived at during generation of the user interface layout.

Additionally, every section is a collection of user interface elements. The layout of these user interface elements within the sections is also captured as logical coordinates. These logical coordinates have their scope within the section, and this ensures that the user interface elements maintain their logical positioning irrespective of how the sections are positioned. This setup gives great control to the user interface engineer to concentrate on laying out controls within a section and then concentrating on how such sections are positioned in a page. Every section can then have command buttons that perform specific actions on user invocation. For the positioning of these buttons, they can be considered as any other user interface element and be positioned as required.

The traversal from one user interface to another user interface can be specified as traversal links. These links are special user interface links that can be positioned in any section. These links can also be superimposed on display only data items, which provide the end user with the capability of a Data-Specific Hyper Link.

Every data set on a user interface screen with multiple elements can be specified as a grid. In one embodiment of the invention, a grid is treated as a single element for positioning in a section. This enables the layout of a section that is immune to any changes in the layout of such grids. Each grid can then have a set of user interface elements which repeat for every row of data. The positioning of the user interface elements in a grid follows the ordering of the user elements within a grid. Rendering of these elements is taken care of while generating the user interface.

Each of these user interface elements can have a set of sample data associated with them. These data will be used to fill the user interface when generated as a prototype. This enables the end user to have a feel of how the user interface would look and behave with data filled in. This approach also enables a user to have a feel of the functionality of the user interface with data relevant to the user's business. This prototype can be used for initial training and user acceptance from a user interface perspective.

Each of the elements in a section can have documentation associated with it. This will be displayed to the end user as a tool tip in the prototype that is generated from the system.

Figure 4:
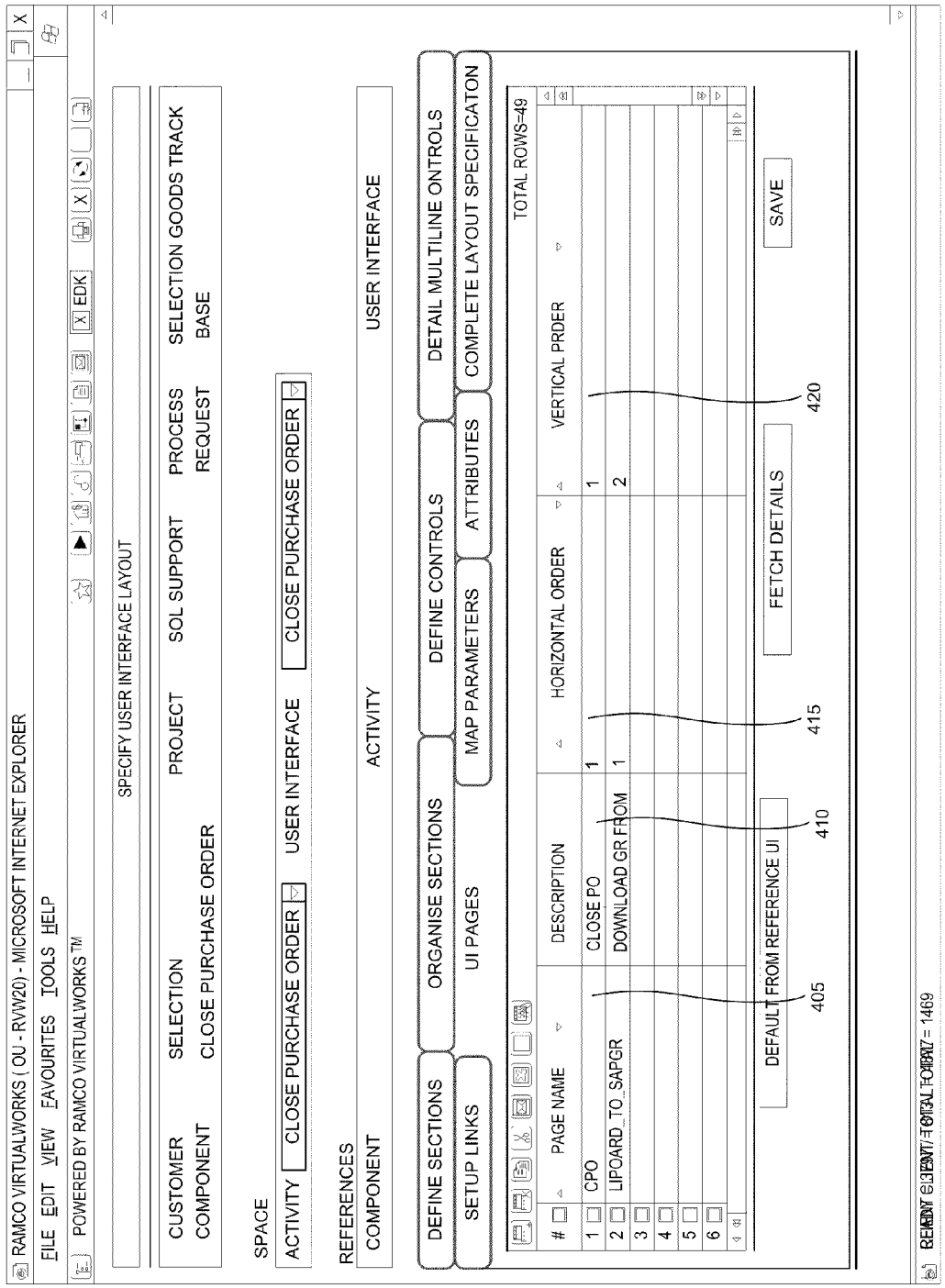
FIG. 4 illustrates an example of an interface used to collect user interface data, according to one embodiment.

FIG. 4 illustrates an example of a typical look and feel of the application used to specify the user interface layout. In the example of FIG. 4, a user interface element is entered in the column at 405. A description of that element is input into the column at 410, and the placement of that element on the screen is dictated by the horizontal order 415 and the vertical order 420. A generator component analyzes these user interface layout elements and generates the user interface deliverable. This component can be configured to generate the user interface for various technologies and various users' needs.

A user can generate the user interface for deployment on a variety of user interface methodologies. Examples of such methodologies include desktop based client server presentation, browser based HTML presentation, and mobile technology based WAP presentation. The user can generate the user interfaces for various purposes such as user interface for user interface acceptance review, user interface for end user training, user interface for use in production, and user interface for use in internal design review. Additional versions of this generation are limited only by the need for new requirements and require personalization of the generator component only.

Figure 5:
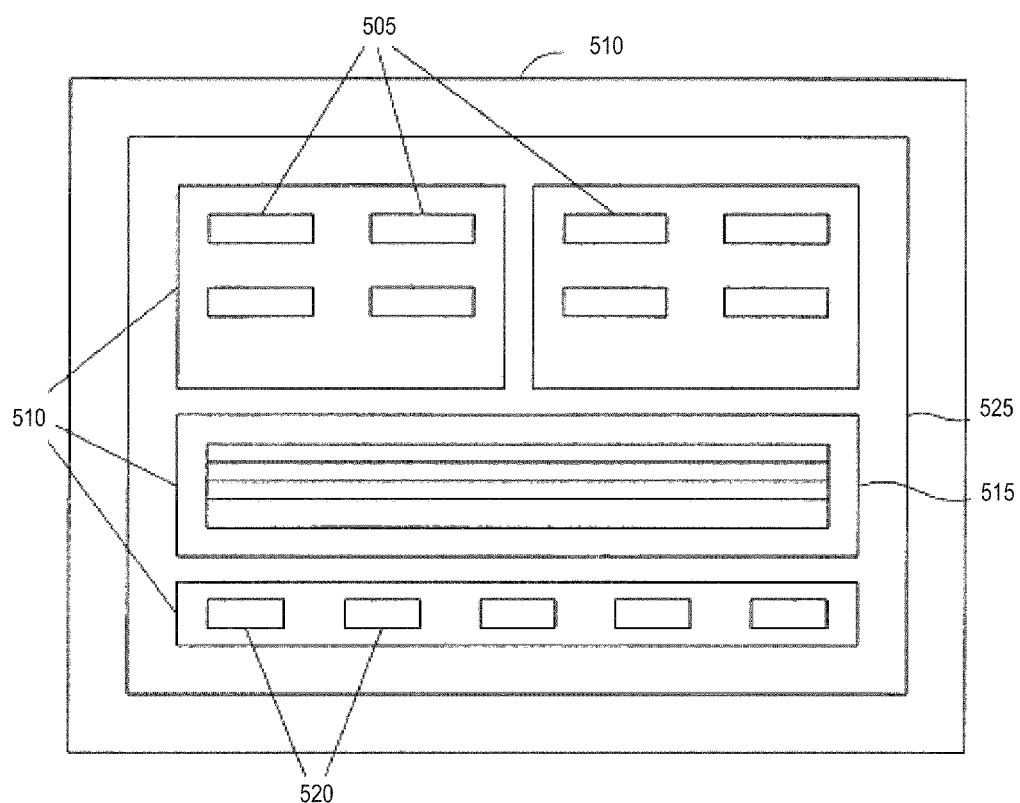
FIG. 5 illustrates a standardized user interface, according to one embodiment.

FIG. 5 illustrates an example of a standardized user interface produced by the application illustrated in FIG. 4. The user interface has edit controls 505, sections 510, grid controls 515, task buttons 520, and page 525.

The foregoing method has many advantages for the various users of the user interface. First, there is a standardization of look and feel of the user interfaces across the entire system. Second, user interfaces can be delivered on various technologies, and user interfaces can be delivered to various users for various purposes. Third, the user interface layout is isolated from the actual deliverable and gives greater control to the user interface designer. Fourth, the ability to preview the user interface at any point in time of the user interface layout process provides the designer with the ability to visualize how the end deliverable would actually look. Fifth, there is no longer a dependency on a highly skilled user interface designer, since the required data is modeled and available for further changes by any other designer. Finally, this is all made possible by well-documented translation semantics for various technologies and end user requirements.

Web applications, virtually all of which operate with user interfaces in a screen or page based environment, send data by submitting the entire web page. This gives a different look and feel to the application users, because many application users are accustomed to desktop based applications which make a call to fetch data and refresh only the necessary controls. To solve this problem, the grid control in the invention gets or submits data using a hidden IFRAME, so that, there will not be a page refresh. This gives a traditional desktop based look and feel on the Web browser. The grid control has a very rich user interface just like an ACTIVEX control. The grid has a row header, column header, vertical scrollbar and a horizontal scrollbar. The row header displays the row numbers, and the column header displays column heading, sort buttons and help button. The column heading text colors are different for mandatory columns and regular columns. Different background colors are used to differentiate editable and non-editable columns.

The grid control of the invention has two modes of operation—display mode, in which it displays the content as text, and edit mode. The grid places the cell in edit mode when a focus rectangle is over the cell and when the user presses an appropriate key, double clicks on the cell, or starts typing the data. When the cell goes into edit mode, the cell shows an appropriate control, like a combination box, text box or text area, based on the column data type. If the data type is date, then the user can either enter the date or choose it from the built-in calendar. After entering the data in a cell, if the user presses the enter key, control goes to the next editable cell and places that cell in edit mode. This gives the user the ability to enter data continuously without using navigation keys like arrow keys or the TAB key. Additionally, the grid control supports display only columns, text columns, numeric columns, text area columns, combination box columns and URL columns.

In one or more embodiments of the invention, the grid control is a pure HTML based editable grid control with a user interface that rivals traditional desktop based ACTIVEX grid controls. Since it is HTML based, it does not require any specific platform or browser, and it can be rendered on thin client devices like Pocket PCs. Moreover, since it is HTML based, it can be hosted on any Web server such as ASP, JSP, or ASPX, and no extra security setting is required on the client browser.

The grid control can be personalized, at runtime, for each application user. Each user can re-arrange the columns in the way he wants it. Similarly, users can change the width of the columns and height of the rows. The personalization information is persisted in the Web server for better performance.

Transferring huge chunks of data over the Web is a time consuming task, and it adds to the transaction execution time. Keeping this in mind, the grid control stores all its data in the Web server (until the user is ready to submit the transaction), and it transfers a limited number of rows back and forth between the client and the web server. For example, if an engineering order has 500 items and the engineering order screen grid control has 10 visible rows, the client buffer size would be 30 rows (default is 3 times the visible rows). If the user scrolls down beyond 30 rows, the grid control makes a request to the Web server in the background and displays the rows from the 31.sup.st row onwards. This fetch is transparent to the user, and it is done through a Hidden IFRAME.

The grid control keeps track of the state of each row. For example, it tracks whether the row is fetched, inserted, modified or deleted. Based on this state, only modified rows are sent for transaction updates. This very much improves the performance, especially for the Web based applications.

The grid control comes with many useful features, like importing data from Excel and exporting data to Excel for further analysis. Data can be sorted using the sort buttons available on the column header. A search facility allows the user to search for a value on a column or on the entire grid. Similarly, insert row, delete row, cut and append rows, and copy and append rows are available for row based operations. The grid control provides a special column, with a checkbox, to enable the selection of rows for row based operations. The grid control has another feature called Zoom or Snapshot, in which the user can view one row of data in a dialog box. The Zoom feature is very useful when the grid has many columns to display and the user wants to see many of them without scrolling too much.

Figure 6:
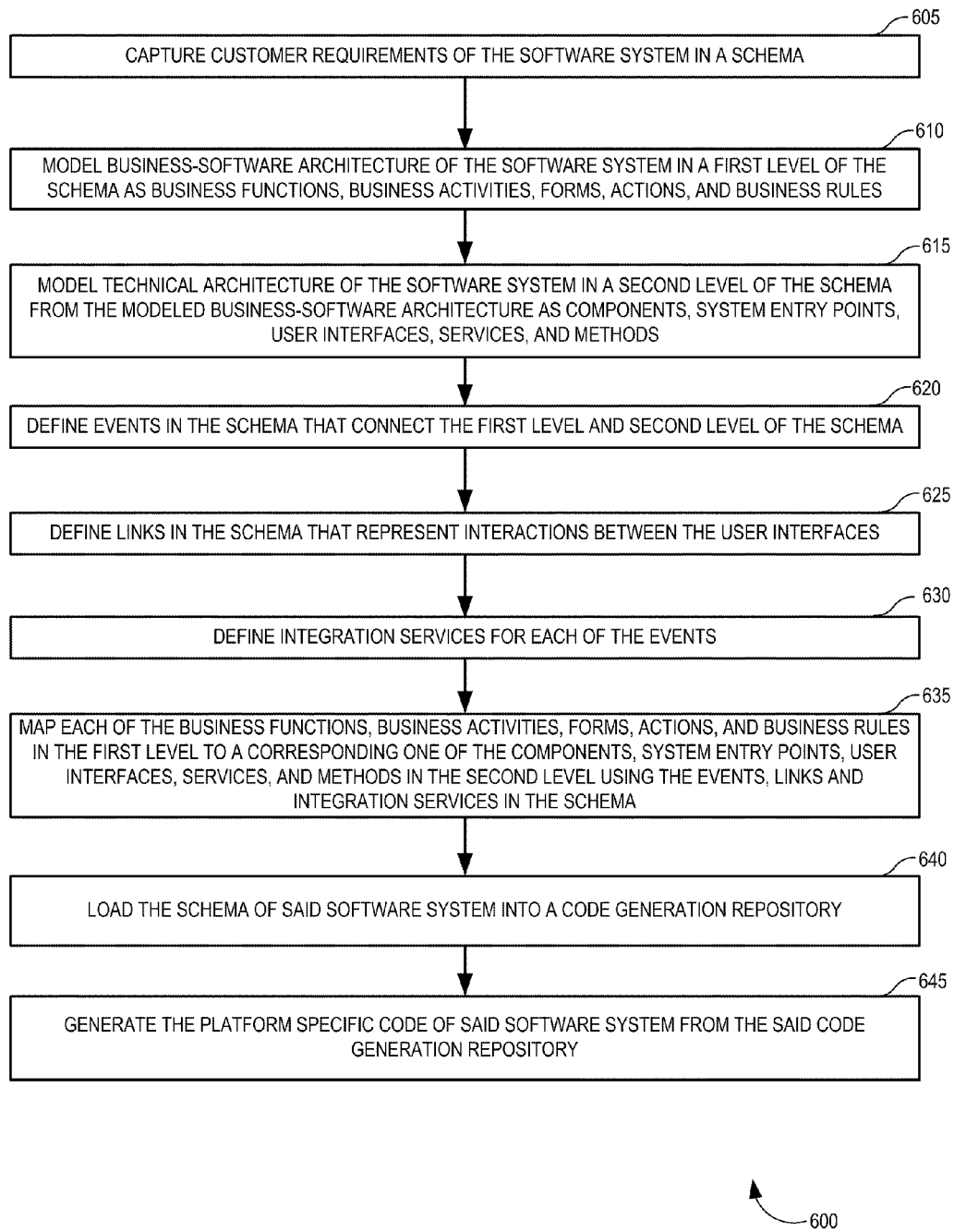
FIG. 6 is a process flowchart illustrating a method for generating platform specific code for a software system, according to one embodiment.

FIG. 6 is a process flowchart 600 illustrating a method for generating platform specific code for a software component based software system, according to one embodiment. In operation 605, customer requirements of the software component are captured in a schema. In one example embodiment, the customer requirements are captured through triggered events. The software component includes a self contained software application which encapsulates and implements a single business process. In operation 610, business-software architecture of the software component is modeled in a first level of the schema as business functions, business activities, forms, actions, and business rules. In these embodiments, each of the business functions represents functions performed in the single business process of the software system, each of the business activities represents activities performed in each of the business functions, each of the forms includes semantics to capture and retrieve information for each of the business activities, each of the actions includes tasks performed in each of the forms, and each of the business rules includes rules that govern each of the actions.

In operation 615, technical architecture of the software system is modeled in a second level of the schema from the modeled business-software architecture as components, system entry points, user interfaces, services, and methods. In these embodiments, each of the components corresponds to each of the business functions of the single business process, each of the system entry points corresponds to visual-interface elements of each of the business activities, and each of the user interfaces with visual-interface elements corresponds to each of the forms. Further, each of the services corresponds to each of the actions performed in each of the user interfaces, and each of the methods corresponds to each of the business rules that are invoked in handling each of the services.

In operation 620, events in the schema that connect the first level and second level of the schema are defined. In one example embodiment, the events include entry events and exit events. In these embodiments, each of the entry events is a stimulus that triggers a business function, a business activity, or a form and each of the exit events is a response from the respective business function, business activity, or form to the stimulus.

In operation 625, links in the schema that represent interactions between the user interfaces are defined. In one example embodiment, each of the links includes cross connections between the visual-interface elements in the user interfaces and the events associated with at least one of the business functions, business activities, and forms.

In operation 630, integration services for each of the events are defined in the schema. In one example embodiment, integration services define cross connections for data updates between the events associated with at least one the business functions, business activities, and forms in the first level and services and methods in the second level.

In operation 635, each of the business functions, business activities, forms, actions, and business rules in the first level is mapped to a corresponding one of the components, system entry points, user interfaces, services, and methods in the second level using the events, links and integration services in the schema. In step 640, the schema of the software component is loaded into a code generation repository. In step 645, the platform specific code of the software component is generated from the code generation repository based on the modeled technical architecture, the defined events, the defined links, the defined integration services, and the mappings in the schema.

Further, model elements that describe interactions among software components are generated. Furthermore, connector interfaces are provided among software components. Moreover, stubs are provided to serve as connector interfaces for testing. In one example embodiment, stubs are provided within the platform specific code, thereby producing code that is standalone. Also, formal data structures are provided as a standard representation of the schema. The code generators with standard semantics are provided for multiple technologies.

Furthermore, a code generator that generates process flows is provided. In one example embodiment, the code generator uses interfaces offered by standard artifacts for specific technologies and generates the artifacts into different technology layers. Also, the software component is deployed based software system onto the Internet. Moreover, connector interfaces, interface specifications, and interface behavior specifications are provided for the software component to interact with a plurality of other software components. In addition, a standardized schema is provided, thereby producing standard semantics for multiple technologies.

Also, artifacts of one or more of the impacted items can be generated and the artifacts can be associated with the repository elements in a maintenance management system. For example, the artifacts include data structure artifacts, user-interface artifacts, and/or application service artifacts. In one exemplary implementation, data structure artifacts are generated from the events and the components, user-interface artifacts are generated from the system entry points and the user interfaces, and application service artifacts are generated from the services and the methods (e.g., as illustrated in FIG. 1). In addition, a set of error conditions are defined from the methods, and application service artifacts are generated from the error conditions.

In accordance with the above described embodiments with respect to FIG. 2 and FIG. 3, the business process may include payables management, employee management, etc. Further, the example attributes associated with each of the business functions, business activities, forms, actions, and business rules in the first level and the corresponding one of the components, system entry points, user interfaces, services, and methods in the second level associated with the payables management and the employee management is depicted in the following table 2.

TABLE 2

| Element | Example 1 | Example 2 |
| --- | --- | --- |
| Business Process | Payables Management | Employee Management |
| Business Functions | Invoice | Leave Management |
| Business Activities | Create Invoice | Create Leave Request |
| Forms | Create Invoice | Create Leave Request |
| Actions | Create Invoice | Create Leave Request |
| Business Rules | Validate Invoice Date | Validate Leave Balance |
| Events | Update Financial Book | Update Leave Balance |
| Links | View Purchase Order | View Leave Balance |
| Integration Services | Update Financial Book | Update Leave Balance |
| Components | Invoice | Leave Management |

TABLE 2-continued

| Element | Example 1 | Example 2 |
| --- | --- | --- |
| System Entry Points | Create Invoice | Create Leave Request |
| Services | Create Invoice | Create Leave Request |
| Methods | Validate Invoice Date | Validate Leave Balance |
| Error Conditions | Invalid Invoice Date | Insufficient Leave Balance |
| Data Structure Artifacts | InvoiceSchema.sql (Table Schema) CreateInvoiceHeader.sql (Stored Procedure) | LeaveSchema.sql (Table Schema) CreateLeaveRequest.sql (Stored Procedure) |
| User Interface Artifacts | CreateInvoice.htm CreateInvoice_UserJS.js CreateInvoice.cs (Activity source) CreateInvoice.dll (Activity Deliverable) | CreateLeaveRequest.htm CreateLeaveRequest_UserJS.js CreateLeaveRequest.cs (Activity source) CreateLeaveRequest.dll (Activity Deliverable) |
| Application Service Artifacts | Invoice.cs (Component Code) Invoice.dll (Component Deliverable) InvoiceServices.cs (Service Code) InvoiceServices.dll (Service Deliverable) | Leave.cs (Component Code) Leave.dll (Component Deliverable) LeaveServices.cs (Service Code) LeaveServices.dll (Service Deliverable) |

As shown in Table 2, an example for business process 108 may include employee management in an organization. The business functions 110 may include leave management associated with the employee. The business activities 112 may include "create leave request". The forms 114 may be defined in terms of show leave request, a screen, and others. The actions 116 may include creating leave request for the employee based on the activity and form. The business rules 118 may include "validate leave balance" to authenticate the leave request of the employee based on the leave request created.

The events 120 may include update leave balance based on the business functions 110, business activities 112, and forms 114. The links 122 may include a link "view leave balance", corresponding to the business activities and forms of the business function "leave management", displayed between the user interfaces.

The integration services 124 may include updating the leave balance information based on the cross connections between events 120 associated with at least one the business functions, business activities, and forms when creating and validating the leave balance in design architecture level. Further, the examples associated with each of the corresponding components 128, system entry points 130, user interfaces 132, services 134, and methods 136 in the technical and design architecture level can be depicted from the Table 2. Further the error conditions 142 may include "insufficient leave balance" which can be generated based on the outcome of validation of the leave request (methods 136) corresponding to the business rules 118. Also, the data structure artifacts 126, user interface artifacts 138 and application service artifacts 140 associated with the leave management of the employee is shown in Table 2. As described above, changes in any of the attributes of the business-software architecture changes the attributes in the software system. These changes can be analyzed using the mappings stored in the knowledge repository. In one embodiment, the mappings include connections between the attributes in the software system in the business environment.

Figure 7:
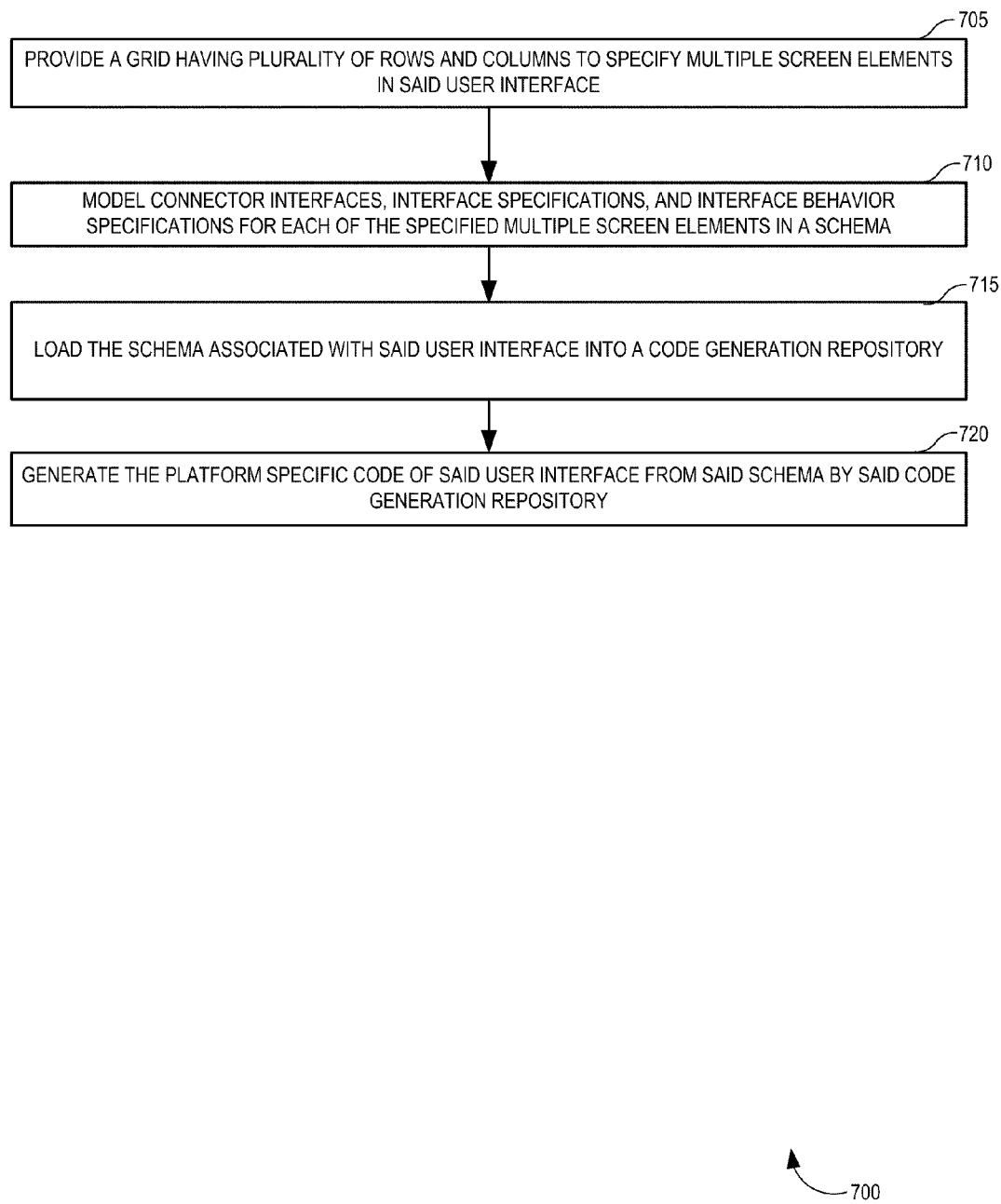
FIG. 7 is a process flowchart illustrating a method for generating platform specific code for a user interface in a software system, according to one embodiment.

FIG. 7 is a process flowchart 700 illustrating a method for generating platform specific code for a user interface in a software system, according to one embodiment. In operation 705, a grid having plurality of rows and columns is provided to specify multiple screen elements in the user interface using a computer. In one example embodiment, the grid further includes a grid control to provide a user with an ability to define a layout of the user interface, re-arrange columns and rows, and to alter the width and the height of the plurality of rows and columns.

In operation 710, connector interfaces, interface specifications, and interface behavior specifications for each of the specified multiple screen elements are modeled in a schema. Each of the connector interfaces defines interfaces through which the user interface interacts with other user interfaces in the software system. Further, each of the interface specifications defines structure of information exchange between the other interacting user interfaces. Furthermore, each of the interface behavior specifications defines logic flow within the user interface when the user interface is invoked.

In operation 715, the schema associated with the user interface is loaded into a code generation repository using the computer. In step 720, the platform specific code of the user interface is generated from the schema by the code generation repository. In one example embodiment, the generation of platform specific code includes analyzing specified multiple screen elements and generating a deliverable user interface.

In one example embodiment, the method uses translation semantics for a platform specific technology. In another example embodiment, the method uses an IFRAME to avoid a page refresh of the user interface. Further, a display mode and an edit mode are provided for the grid.

Figure 8:
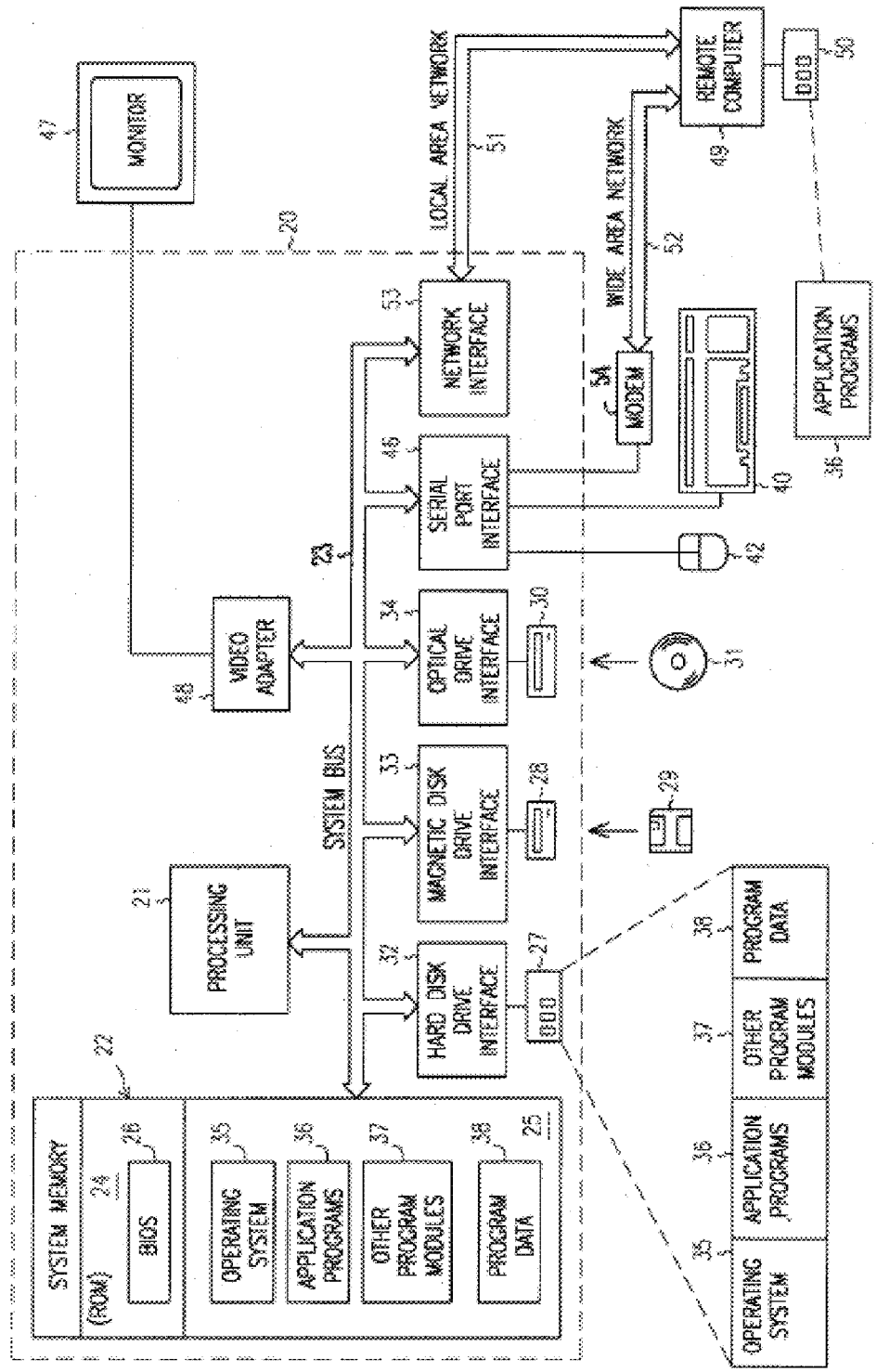
FIG. 8 illustrates a computer system upon which the present invention can reside and operate.

FIG. 8 is an overview diagram of a hardware and operating environment in conjunction with which embodiments of the invention may be practiced. The description of FIG. 8 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 8, a hardware and operating environment is provided that is applicable to any of the servers and/or remote clients shown in the other Figures.

As shown in FIG. 8, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 8 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 Via the serial port interface 46. In a networked environment, program modules depicted relative to the computer 20 can be stored in the remote memory storage device 50 of remote computer, or server 49. It is appreciated that the network connections shown are exemplary and other means of, and communication devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

In accordance with the above described embodiments with respect to FIG. 8, the system includes a processing unit 21, and memory 22 operatively coupled to the processor 21, wherein the memory 22 having instructions capable of: capturing customer requirements of the software component in a schema, modeling business-software architecture of the software component in a first level of the schema as business functions, business activities, forms, actions, and business rules, modeling technical architecture of the software system from the modeled business-software architecture as components, system entry points, user interfaces, services, and methods in a second level of the schema, defining events in the schema that connect the first level and the second level of the schema, defining links in the schema that represent interactions between the user interfaces, defining integration services in the schema for each of the events, mapping each of the business functions, business activities, forms, actions, and business rules in the first level to a corresponding one of the components, system entry points, user interfaces, services, and methods in the second level using the events, links, and integration services in the schema, loading the schema of the software component into a code generation repository; and generating the platform specific code of the software component from the code generation repository based on the modeled technical architecture, defined events, defined links, defined integration services, and mappings in the schema.

In these embodiments, the software component includes a self contained software application which encapsulates and implements a single business process. Further, each of the business functions comprises functions performed in the single business process of a software system, and each of the business activities comprises activities performed in each of the business functions, and each of the forms comprises semantics to capture and retrieve information for each of the business activities, and each of the actions comprises tasks performed in each of the forms, and each of the business rules comprises rules that govern each of the actions.

Furthermore, each of the components corresponds to each of the business functions of the single business process, and each of the system entry points corresponds to visual-interface elements of each of the business activities, and each of the user interfaces with visual-interface elements corresponds to each of the forms, and each of the services corresponds to each of the actions performed in each of the user interfaces, and each of the methods corresponds to each of the business rules that are invoked in handling each of the services.

In addition, the events include entry events and exit events, and wherein each of the entry events is a stimulus that triggers a business function, a business activity, or a form and each of the exit events is a response from the respective business function, business activity, or form to the stimulus. Each of the links comprises cross connections between the visual-interface elements in the user interfaces and the events associated with at least one of the business functions, business activities, and forms. The integration services define cross connections for data updates between the events associated with at least one of the business functions, business activities, and forms in the first level and services and methods in the second level.

An article comprising a non-transitory computer readable storage medium having instructions thereon which when executed by a computing platform result in execution of the above mentioned method. The method described in the foregoing may be in a form of a machine-readable medium embodying a set of instructions that, when executed by a machine, causes the machine to perform any method disclosed herein. It will be appreciated that the various embodiments discussed herein may not be the same embodiment, and may be grouped into various other embodiments not explicitly disclosed herein.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A computer implemented model-driven method for generating platform specific code for a software component based software system, comprising:

capturing customer requirements of the software component in a schema, wherein the software component includes a self contained software application which encapsulates and implements a single business process;

modeling business-software architecture of the software component in a first level of the schema as business functions, business activities, forms, actions, and business rules, wherein each of the business functions comprises functions performed in the single business process of a software system, and wherein each of the business activities comprises activities performed in each of the business functions, and wherein each of the forms comprises semantics to capture and retrieve information for each of the business activities, and wherein each of the actions comprises tasks performed in each of the forms, and wherein each of the business rules comprises rules that govern each of the actions;

modeling technical architecture of the software system from the modeled business-software architecture as components, system entry points, user interfaces, services, and methods in a second level of the schema, wherein each of the components corresponds to each of the business functions of the single business process, and wherein each of the system entry points corresponds to visual-interface elements of each of the business activities, and wherein each of the user interfaces with visual-interface elements corresponds to each of the forms, and wherein each of the services corresponds to each of the actions performed in each of the user interfaces, and wherein each of the methods corresponds to each of the business rules that are invoked in handling each of the services;

defining events in the schema that connect the first level and the second level of the schema, Wherein the events comprise entry events and exit events, and wherein each of the entry events is a stimulus that triggers a business function, a business activity, or a form and each of the exit events is a response from the respective business function, business activity, or form to the stimulus;

defining links in the schema that represent interactions between the user interfaces, wherein each of the links comprises cross connections between the visual-interface elements in the user interfaces and the events associated with at least one of the business functions, business activities, and forms;

defining integration services in the schema for each of the events, wherein integration services define cross connections for data updates between the events associated with at least one of the business functions, business activities, and forms in the first level and services and methods in the second level;

mapping each of the business functions, business activities, forms, actions, and business rules in the first level to a corresponding one of the components, system entry points, user interfaces, services, and methods in the second level using the events, links, and integration services in the schema;

providing connector interfaces, interface specifications, and interface behavior specifications for the software component in the schema, wherein the connector interfaces define interfaces through which the software component interacts with a plurality of other software components of the software system, the interface specifications define structure of information exchanged with interacting software components, and the interface behavior specifications define logic flow within the software component when an interface is invoked;

loading the schema of the software component into a code generation repository;

generating a standalone version and an integrated version of the platform specific code of the software component from the code generation repository based on the modeled technical architecture, defined events, defined links, defined integration services, and mappings in the schema;

performing unit testing of the standalone version of the software component, wherein stubs are provided to serve as connector interfaces to ensure independent deployment of the software component for the unit testing; and performing a separate integration testing of the integrated version of the software component along with software components interacting with the integrated version of the software component using the connector interfaces provided in the schema.

2. The method according to claim 1, further comprising generating model elements that describe interactions among software components.

3. The method according tea claim 1, further comprising providing formal data structures as a standard representation of the schema.

4. The method according to claim 1, further comprising providing code generators with standard semantics for multiple technologies.

5. The method according to claim 1, further comprising providing a code generator that generates process flows.

6. The method according to claim 5, further comprising steps wherein the code generator uses interfaces offered by standard artifacts for specific technologies and generates the artifacts into different technology layers.

7. The method according to claim 1, further comprising deploying the software component based software system onto the Internet.

8. The method according to claim 1, further comprising providing the stubs within platform specific code, thereby producing the standalone version of the platform specific code.

9. The method according to claim 1, further comprising providing a standardized schema, thereby producing standard semantics for multiple technologies.

10. A system for generating platform specific code for a software component based software system, comprising:

a processor, and memory coupled to the processor, wherein the having instructions capable of:

capturing customer requirements of the software component schema, wherein the software component includes a self contained software application which encapsulates and implements a single business process;

modeling business-software architecture of the software component in a first level of the schema as business functions, business activities, forms, actions, and business rules, wherein each of the business functions comprises functions performed in the single business process of a software system, and wherein each of the business activities comprises activities performed in each of the business functions, and wherein each of the forms comprises semantics to capture and retrieve information for each of the business activities, and wherein each of the actions comprises tasks performed in each of the forms, and wherein each of the business rules comprises rules that govern each of the actions;

modeling technical architecture of the software system from the modeled business-software architecture as components, system entry points, user interfaces, services, and methods in a second level of the schema, wherein each of the components corresponds to each of the business functions of the single business process, and wherein each of the system entry points corresponds to visual-interface elements of each of the business activities, and wherein each of the user interfaces with visual-interface elements corresponds to each of the forms, and wherein each of the services corresponds to each of the actions performed in each of the user interfaces, and wherein each of the methods corresponds to each of the business rules that are invoked in handling each of the services;

defining events in the schema that connect the first level and the second level of the schema, wherein the events comprise entry events and exit events, and wherein each of the entry events is a stimulus that triggers a business function a business activity, or a form and each of the exit events is a response from the respective business function, business activity, or form to the stimulus;

defining links in the schema that represent interactions between the user interfaces, wherein each of the links comprises cross connections between the visual-interface elements in the user interfaces and the events associated with at least one of the business functions, business activities, and forms;

defining integration services in the schema for each of the events, wherein the integration services define cross connections for data updates between the events associated with at least one of the business functions, business activities, and forms in the first level and services and methods in the second level;

mapping each of the business functions, business activities, forms, actions, and business rules in the first level to a corresponding one of the components, system entry points, user interfaces, services, and methods in the second level using the events, links, and integration services in the schema;

providing connector interfaces, interface specifications, and interface behavior specifications for the software component in the schema, wherein the connector interfaces define interfaces through which the software component interacts with a plurality of other software components of the software system, the interface specifications define structure of information exchanged with interacting software components, and the interface behavior specifications define logic flow within the software component when an interface is invoked;

loading the schema of the software component into a code generation repository;

generating a standalone version and an integrated version of the platform specific code of the software component from the code generation repository based on the modeled technical architecture, defined events, defined links, defined integration services, and mappings in the schema;

performing unit testing of the standalone version of the software component, wherein stubs are provided to serve as connector interfaces to ensure independent deployment of the software component for the unit testing; and performing a separate integration testing of the integrated version of the software component along with software components interacting with the integrated version of the software component using the connector interfaces provided in the schema.

11. A non-transitory computer-readable storage medium for generating platform specific code for a software component based software system having instructions that, when executed by a computing device, cause the computing device to perform a method comprising:

capturing customer requirements of the software component in a schema, wherein the software component includes a self contained software application which encapsulates and implements a business process;

modeling business-software architecture of the software component in a first level of the schema as business functions, business activities, forms, actions, and business rules, wherein each of the business functions comprises functions performed in the business process of a software system, and therein each of the business activities comprises activities performed in each of the business functions, and wherein each of the forms comprises semantics to capture and retrieve information for each of the business activities, and wherein each of the actions comprises tasks performed in each of the forms, and wherein each of the business rules comprises rules that govern each of the actions, modeling technical architecture of the software system from the modeled business-software architecture as components, system entry points, user interfaces, services, and methods in a second level of the schema, wherein each of the components corresponds to each of the business functions of the single business process, and wherein each of the system entry points corresponds to visual-interface elements of each of the business activities, and wherein each of the user interfaces with visual-interface elements corresponds to each of the forms, and wherein each of the services corresponds to each of the actions performed in each of the user interfaces, and wherein each of the methods corresponds to each of the business rules that are invoked in handling each of the services;

defining events in the schema that connect the first level and the second level of the schema, wherein the events comprise entry events and exit events, and wherein each of the entry events a stimulus that triggers a business function, a business activity, or a form and each of the exit events is a response from the respective business function, business activity, or form to the stimulus;

defining links in the schema that represent interactions between the user interfaces, wherein each of the links comprises cross connections between the visual-interface elements in the user interfaces and the events associated with at least one of the business functions, business activities, and forms;

defining integration services in the schema for each of the events, wherein integration services define cross connections for data updates between the events associated with at least one the business functions, business activities, and forms in the first level and services and methods in the second level;

mapping each of the business functions, business activities, forms actions, and business rules in the first level to a corresponding one of the components, system entry points, user interfaces, services, and methods in the second level using the events, links, and integration services in the schema;

providing connector interfaces, interface specifications, and interface behavior specifications for the software component in the schema, wherein the connector interfaces define interfaces through which the software component interacts with a plurality of other software components of the software system, the interface specifications define structure of information exchanged with interacting software components, and the interface behavior specifications define logic flow within the software component when an interface is invoked;

loading the schema of the software component into a code generation repository;

generating a standalone version and an integrated version of the platform specific code of the software component from the code generation repository based on the modeled technical architecture, defined events, defined links, defined integration services, and mappings in the schema;

performing unit testing of the standalone version of the software component, wherein stubs are provided to serve as the connector interfaces to ensure independent deployment of the software component for the unit testing; and perform a separate integration testing of the integrated version of the software component along with software components interacting with the integrated version of the software component using the connector interfaces provided in the schema.

* * * * *